March 30, 1943.   R. H. EARLE   2,315,320
AUTOMATIC CIRCUIT-INTERRUPTING DEVICE
Filed April 21, 1939   3 Sheets-Sheet 1

INVENTOR.
Ralph H. Earle
BY Chester W. Brown
ATTORNEY.

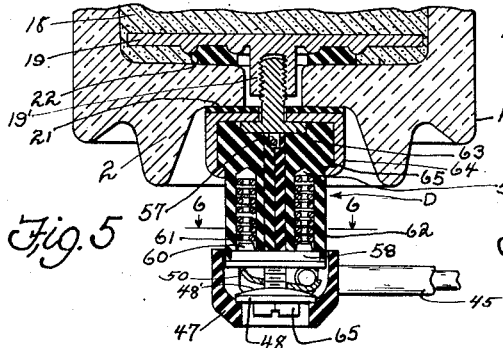
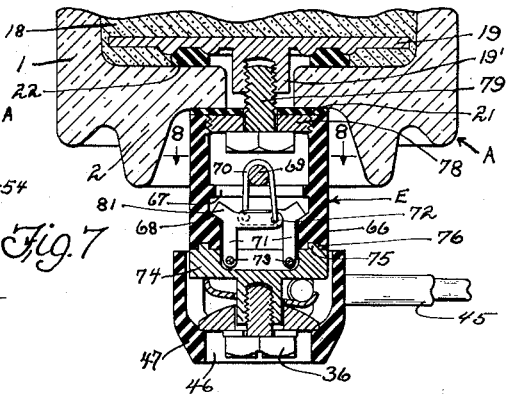
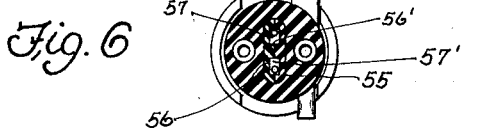
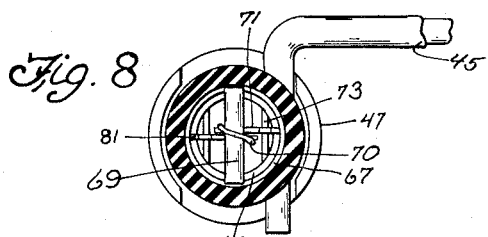
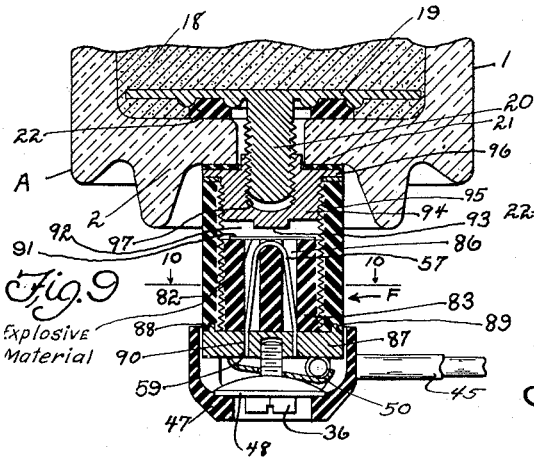
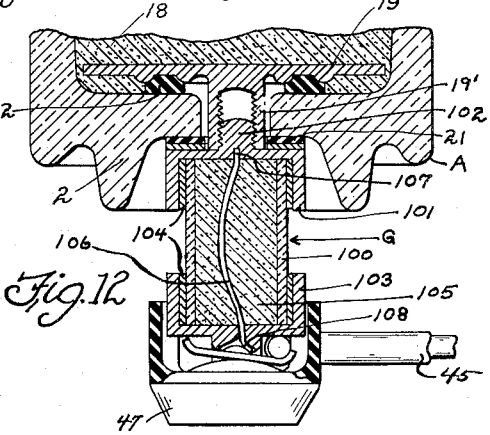
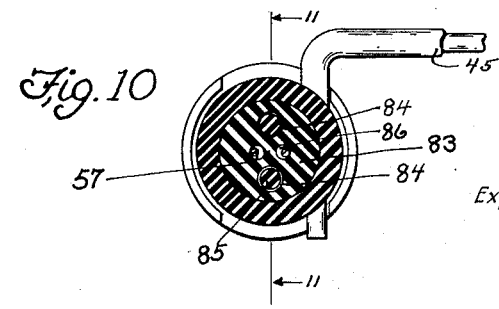
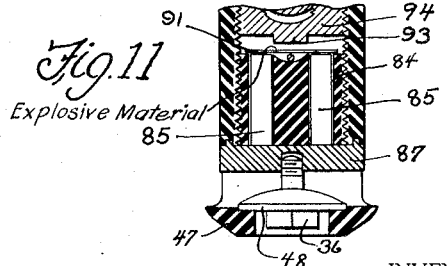

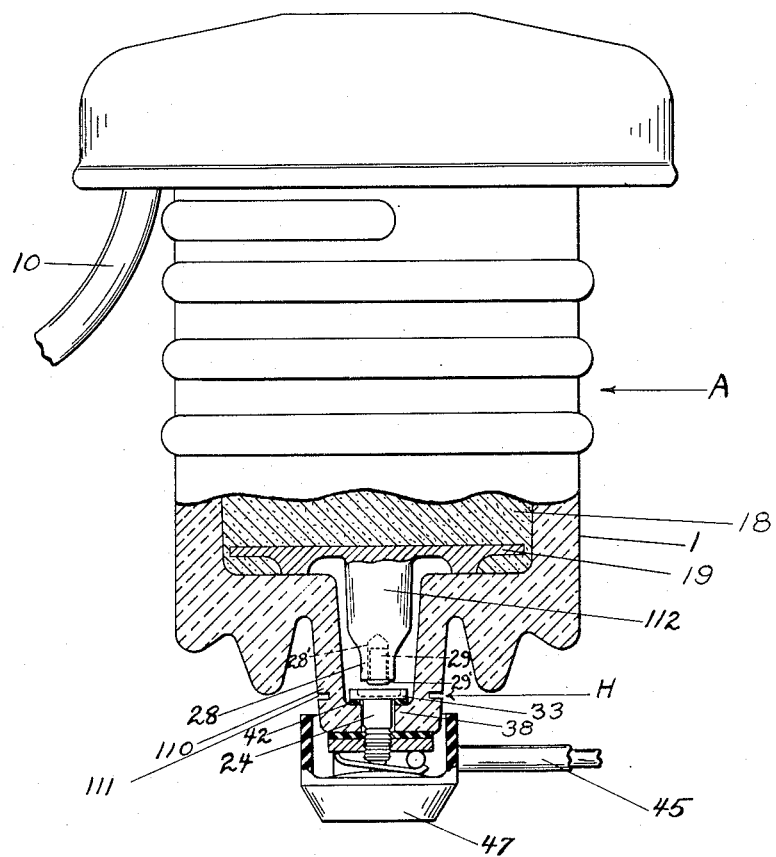

Patented Mar. 30, 1943

2,315,320

UNITED STATES PATENT OFFICE 2,315,320

AUTOMATIC CIRCUIT-INTERRUPTING DEVICE

Ralph H. Earle, Wauwatosa, Wis., assignor to Line Material Company, South Milwaukee, Wis., a corporation of Delaware Application April 21, 1939, Serial No. 269,065

28 Claims. (Cl. 200—115)

This invention relates to an automatic circuit-interrupting device for protective apparatus in electric transmission lines.

Lightning arresters of the class hereinafter described comprise a combined enclosed arc gap and valve material connected in series. The gap is intended to break down when a voltage higher than a predetermined value is impressed thereon and to interrupt current flow across the gap when the voltage and current flow have dropped to predetermined values. The valve material is intended to limit current flow across the gap to an amount determined by the voltage impressed on the gap. Thus the gap and the valve material are coordinated to permit voltages in an electric line in excess of a predetermined value to be discharged to ground and to interrupt the flow of current to ground when the line voltages have returned to a value below the predetermined value.

Heretofore it has been impractical to provide arresters which will operate with complete satisfaction under all conditions of surge and current flow and therefore arresters now available are subject to destruction or serious damage when subjected to energy discharges above a predetermined value.

In some types of arresters, the line of demarcation between successful operation and destruction or damage may, for practical purposes, be considered as well defined. In other types of arresters, there is no such line of demarcation, but instead we find three zones of energy discharge, in one of which the arrester operates successfully to interrupt current flow, in one of which it fails to interrupt current flow but is not immediately subjected to destruction or damage, and in one of which it is almost immediately subjected to destruction or damage on the occurrence of a discharge therethrough.

The general practice is to provide arresters with frangible housings which under destructive discharges are shattered. As a result, parts of the shattered housing may be strewn about the ground and subject persons in the vicinity to injury.

In order to minimize breakage of arrester housings and to interrupt current flow through the arresters when the energy discharge therethrough is above a value which prevents successful current-interrupting operation of the arresters, it is an object of this invention to provide a circuit-interrupting device having a time-current characteristic which is coordinated with the arc gap and valve material of an arrester to effect current interruption only when the energy discharge is above a maximum value at which the arrester will still operate successfully.

It is also an object of this invention to provide for protective apparatus in an electric circuit, an automatically operable circuit-interrupting device adapted to introduce an extended gap in a circuit through the protective apparatus upon the occurrence of abnormal and continued flow of current and the failure of the protective apparatus in its function.

A more specific object of this invention is to provide for a lightning arrester a rupturable auxiliary spark gap in series connection with the arrester which, upon the occurrence of a flow of current exceeding a predetermined value across the gap during a predetermined period of time, or upon the discharge of extremely large surges, is adapted to extend the gap between the arrester and ground.

A further object is to provide a rupturable auxiliary gap for the ground line of a lightning arrester adapted to disconnect the ground line from the arrester upon occurrence of current flow and of voltages above predetermined values, and to serve as an indicator that the arrester has failed to function.

Another object is to provide an auxiliary circuit-interrupting device for lightning arresters which is adapted for connection to an arrester without structural alteration in the latter and which will operate to isolate the arrester without destruction of its structure.

In the drawings:

Figs. 5, 7, 9 and 12 are sectional views of a lower portion of a lightning arrester and modified forms of circuit-interrupting device embodying my invention.

Fig. 6 is a sectional view taken on the line 6—6 of Fig. 5.

Fig. 8 is a sectional view taken on the line 8—8 of Fig. 7.

Fig. 10 is a sectional view taken on the line 10—10 of Fig. 9.

Fig. 11 is a sectional view of the disconnecting device shown in Fig. 9 and taken on the line 11—11 of Fig. 10.

Fig. 12 is a sectional view depicting a further modification of the circuit interrupting device.

Fig. 13 is a side view in vertical section illustrating another modified form of this invention.

Figure 1:
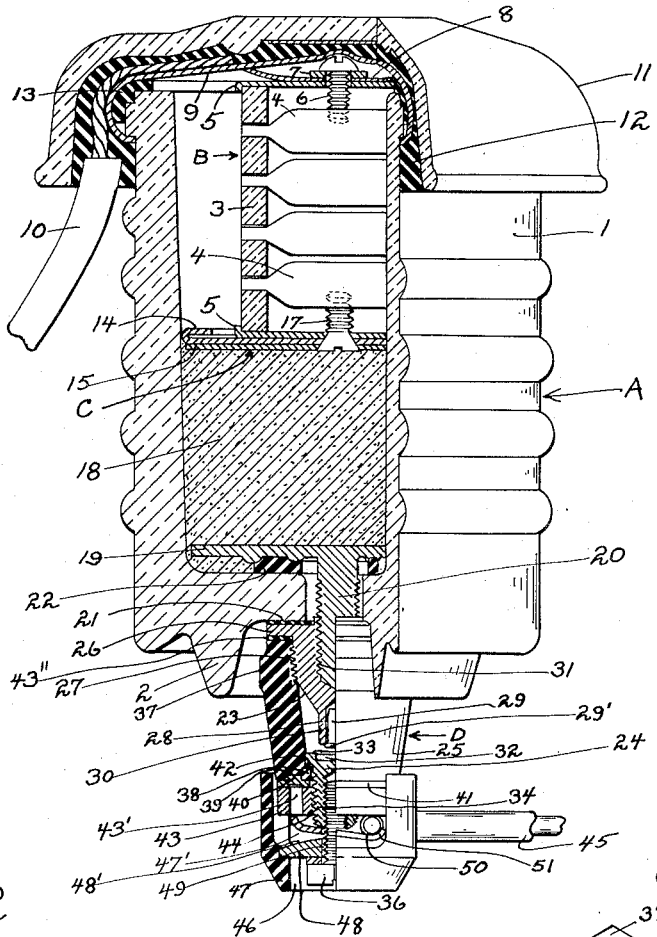
Fig. 1 is a view in partial vertical section showing a lightning arrester and a preferred embodiment of a circuit-interrupting device of this invention.

The lightning arrester A herein disclosed is fully described in my joint patent with Alwin G. Steinmayer, No. 2,165,964, issued July 11, 1939, and the patent to Walter E. Mittelstadt, No. 2,162,697, issued June 27, 1939, but will be briefly described hereinafter.

Throughout the several views like parts are identified by the same reference characters.

The lightning arrester A includes a cylindrical container 1 having a centrally apertured bottom 2 supporting a column of valve material 18 in contact with the lower electrode 19, and upon this column is mounted a gap device B having an electrode C in contact therewith. The gap device B comprises a pair of spaced ceramic supports 3 upon which a plurality of relatively spaced metal cylinders 4 are mounted. Corresponding ends of the supports 3 are connected together by metal strips 5 which are bent at right angles at their ends to prevent the supports from spreading.

The upper strip 5 is secured to the uppermost metal cylinder 4 by means of a bolt 6 engaged therewith and passing through the washer 7 and the strip 5. This bolt also secures to the strip 5 a spring plate 8 which maintains contact with a metal closure 9 closing the upper end of the container 1. A lead-in wire 10 is secured in any suitable manner, such as soldering, to the closure 9 for making electrical contact therewith.

The metal closure and the end of the lead-in wire 10 attached thereto are covered by a glass or porcelain cap 11. A filling of any suitable insulating material 12, such as asphalt, and a rubber washer 13 hermetically seal the upper end of the container 1.

The lower strip 5 on the gap device B contacts a lead cup or plate 14 and a bolt 17 secures the strip 5, cup 14 and plate 15 to the lowermost cylinder 4 on the gap device.

The plate 15 of the electrode C contacts the upper end of the column of valve material 18 comprising any suitable resistance material, such as silicon carbide. The electrode plate 19 is provided centrally thereof with a threaded shank 20 extending downwardly through the bottom 2 of the container 1 and is secured in the container by a terminal nut 23 having a threaded socket 31 receiving the shank 20.

A rubber gasket 22 and a rubber washer 21 are held by the electrode 19 and nut 23 in sealing relation to the aperture in the bottom 2.

The circuit-interrupting device D shown in Figs. 1 and 2 includes as a portion of its structure, the nut 23 which is provided with a radial flange 26, a peripheral thread 27 located below the flange portion, and a hollow electrode portion 28 in which an explosive cap 29 is disposed and secured by a slight indent 30. As indicated, the head or percussion end 29' of the cap projects below the portion 28, but it will be obvious that, if preferred, the portion 28 may be countersunk to receive the percussion end 29'.

The upper end of the housing 25 is sealed by means of a rubber gasket 43'' which is disposed between the flange 26 on the nut 23 and the housing.

The cylindrical housing 25, made of any suitable insulating material, such as "Bakelite," is provided at its upper portion with a hexagonal gripping head 37 and an interiorly threaded portion engaging the thread 27 on the nut 23. The lower portion of the housing 25 is provided with an electrode seat 38 upon which the flange portion 33 of the lower electrode 24 is supported by a resilient sealing washer 42. As shown, the electrode 24 provides a cupped area 32 beneath the head 29' on the percussion cap 29 and the margin of the cupped area is disposed in closer proximity to the electrode portion 28 than it is to the head 29' on the cap 29.

Figure 3:
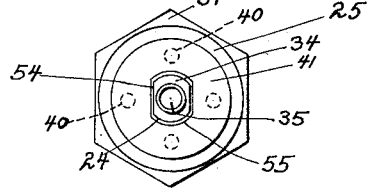
Fig. 3 is a bottom plan view of the circuit-interrupting device shown in Fig. 1 with parts removed.

The lower end of the housing is provided with four equally spaced lug-receiving recesses 39 in which the lugs 40 on the metal ring 41 are seated. The shank portion 34 of the electrode 24 is flattened on diametrically opposite sides at 54 and the ring 41 is provided with an elongated aperture 55 conforming to the periphery of the shank 34 but freely slidable thereon, all as clearly shown in Fig. 3. Thus when the lugs 40 on the ring 41 are disposed in the recesses 39, they will hold the shank 34 against rotation when the nut 43 is threaded on.

Figure 4:
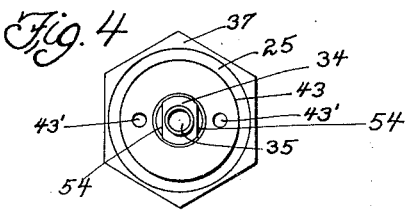
Fig. 4 is a bottom plan view of the circuit-interrupting device shown in Fig. 1 with the wire-clamping mechanism removed.

The circuit-interrupting device D may be assembled by mounting the electrode 24 in the bottom of the housing 25, as shown, mounting the ring 41 on the shank portion 34 of the electrode with the lugs 40 on the ring 41 in apertures 39, and threading the nut 43 upon the shank 34 of the electrode to draw the flange tightly against the washer 42 and the washer snugly in contact with the seat 38 at the lower end of the housing 25. The nut is then set against loosening by means of a punch mark 44. Preferably the nut 43 is provided with diametrically-disposed apertures 43', as shown in Fig. 4, for receiving wrench lugs of a special well-known type of wrench, but not here shown. After the device D has been thus assembled, the housing 25 may be threaded on the nut 23 and brought firmly in contact with the washer 43'' to seal the upper end of the housing.

The ground wire 45 is electrically and mechanically connected to the circuit-interrupting device D by means of a connector comprising a clamping screw 36, a contact plate 50, and a plate-actuating disk 48, all of such parts being shielded by a cylindrical insulating cap 47 having diametrically-disposed wire-receiving passages 47' and an apertured bottom portion 46 to which the actuating disk is secured. As indicated, the disk 48 is provided with a spheroidal surface 48' contacting the plate 50 and with an aperture 49 through which the clamping screw 36 extends.

The ends 51 of the plate 50 are bent angularly toward the nut 43, one end serving to retain the ground wire 45 upon the plate and the other simultaneously contacting the nut 43, thereby cooperating with the spheroidal surface 48' of the disk 48 designed to dispose the point of application of forces tending to bend the screw 36 at a point near the axis of the screw, thereby minimizing the effect of the forces to distort the screw.

It is understood that the lightning arrester A is a protective device for high-tension electric lines designed to relieve such lines from abnormal surges which may damage other apparatus in the line. When a surge above the rated voltage of the arrester occurs in a power system to which the arrester is connected, an arc will be established across the gap device B and in the device D between the electrode portion 28 and margin 33 of the recess 32, and current will then flow through the valve material 18 to ground. If an excessively high current passes through the arrester, it may cause a breakdown of the valve material and form a clinker 52 (Fig. 2) which is relatively highly conductive and no longer effective to stop the flow of follow-current when the line voltage returns to normal. To meet such conditions, I have provided the foregoing described circuit-interrupting device D which operates as follows:

Assuming that a surge to which the arrester A is subjected is not of such magnitude as to destroy the valve characteristics of the material 18, then as soon as the line voltage returns to normal, the material 18 will reduce the flow of current therethrough to a value which will enable the gap to break the arc and thereby interrupt current flow through the arrester. However, occasionally surges occur on power lines which are of such magnitude as to either destroy the arrester or change the valve characteristics of the material 18. When the coordinated characteristics of the gap B and valve material 18 have been altered by excessive energy discharges, the arrester may no longer be effective to interrupt current flow therethough. Therefore, the characteristics of the device D should be such that upon failure of the arrester to operate in its normal manner, the cap 29 will be detonated and the casing 25 ruptured to introduce an extended gap between the arrester and the ground wire 45 and thereby interrupting current flow.

When the arrester A operates normally as intended, the circuit-interrupting device D merely acts as a gap device similar to the gap in the arrester. However, when the arrester is subjected to damaging or destructive surges or current flow, current passing between the electrode portion 28 and rim 33 on the electrode 32 in the device D will raise the temperature of the electrode portion 28 and the heat thus generated will be conducted to the cap 29. If the current flow continues for a period of time, the temperature of the cap 29 will be raised sufficiently to explode the material in the cap and the expanding gases will drive the cap out of the electrode portion 28 and rupture the housing 25 substantially as shown at 53 in Fig. 2 adjacent the lower end of the housing. Upon rupture of the housing 25, the severed portion thereof and lower electrode 24 including parts supported thereby, will be thrown downwardly from the arrester and thereafter supported by the ground wire 45 in spaced relation to that portion of the housing supported by the nut 23 as shown in Fig. 2, thereby affecting interruption of the ground circuit by introducing a wider gap between the arrester and ground than normally is provided in the housing 25.

The electrode portion 28 on the nut 23 is preferably proportioned dimensionally relative to the surge capacity of the arrester to provide a predetermined time lapse between the initial breakdown of the gap B and the destructive or damage point of the arrester required to heat the portion 28 and the cap 29 sufficiently to ignite the explosive material contained in the cap. In other words, the dimensions of the portion 28 are such that under normal conditions of operation of the arrester, heat generated by an arc, striking from the electrode portion 28 to the margin 33, will be dissipated sufficiently to prevent over-heating of the cap 29, but such that under abnormal conditions resulting in failure of the arrester to function as intended, heat generated by the arc will not be dissipated fast enough to prevent over-heating of the cap. The required time delay between initial discharge of a surge and the failure of the arrester can thus be predetermined with a marked degree of accuracy, and explosion of the cap prevented before failure of the arrester but assured within a very small fraction of a second just prior to or immediately after failure.

Although I have indicated that it is preferable to have the arc in the device D strike from the rim 33 to the electrode portion 28, it will be obvious to those skilled in the art that the cap 29 may be constructed to serve as an electrode and to provide a time delay in the conduction of heat to the explosive material therein.

It will also be noted that in the device D the leakage path along the inner wall of the casing 25 between the nut 23 and the electrode 24 is comparatively long relative to the distance between the electrode portion 28 and the rim 33 on the electrode 24, thereby insuring that breakdown between the electrodes will occur at the intended gap space.

Fig. 5 shows a modified form of circuit-interrupting device D which is provided with an insulating housing 62 having a pair of spring-retaining apertures 54 extending from the lower end of the housing and a centrally-disposed slot 55 extending therethrough and elongated in horizontal cross-section as shown in Fig. 6. The upper end of the housing 62 is provided with a peripheral flange 65 which is embraced by ferrule 64. As indicated, the ferrule secures the head of the bolt 63 to the housing, such bolt extending from the ferrule and being threaded into the shank 19' on the electrode 19.

Preferably the bolt 63 is secured against rotation in a suitable manner, not shown, relative to the ferrule 64 and housing 62 so that it may be actuated to draw the electrode 19 into sealing relation to the gasket 22 and the ferrule into sealing relation to the washer 21.

Disposed in the slot 55 is a pair of fibre liners 56, each of which is grooved to provide a central rib 56' contacting the rib on the other liner. The fibre liners 56 are forced tightly into the aperture 55 so that they may not, under conditions to which they are normally subjected, be withdrawn. The supporting wire 57 is looped over the upper end of the ribs 56' and extends downwardly in the slots 57' to the contact plate 58 to which the ends of the wire are secured in any suitable manner such as indicated at 59 in Fig. 9. Thus the plate 58 is supported with the lugs 60 thereon disposed in the apertures 54. The lugs 60 hold the plate 58 non-rotatable relative to the housing 62 and serve to compress the springs 61 in the apertures 54.

Figure 2:
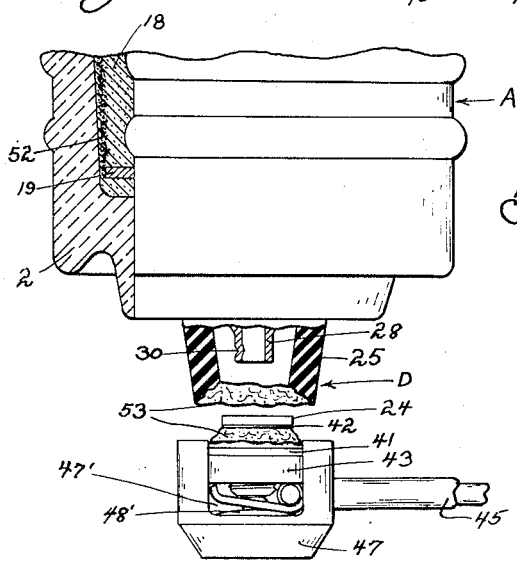
Fig. 2 is a fragmentary view showing the lower portion of the arrester partly in section and the circuit-interrupting device disrupted.

The ground wire 45 is secured to the plate 58 by means similar to that disclosed in Figs. 1 and 2. A clamping bolt 65 threadedly engages the plate 58 and holds the disk 48, upon which the insulating cap 47 is mounted, in contact with the clamping plate 50 which clampingly holds the wire 45 in contact with the plate 58.

It will be observed that the upper end of the looped supporting wire 57 is spaced a short distance from the head of the bolt 63, thereby providing a gap across which an arc will strike when the arrester is functioning to clear a transmission line of excess voltage.

When the arrester has failed to function after a surge therethrough, a clinkered conducting path 52 will be formed as previously indicated, and as a result, follow-current will continue to flow across the gap between the bolt 63 and the strain wire 57. Consequently, the wire 57 will be severed adjacent the bolt 63 and the compressed springs 61 will then be released and will impel the plate 58, connector and the ground wire 45 away from the housing 62 and introduce an extended gap between the arrester and ground with the result that the circuit through the arrester will be broken.

Fig. 7 shows a circuit-interrupting device E comprising a housing 66 having an inner annular rib 67 and an inner beveled shoulder 68 disposed below the rib 67. A support pin 69 extending transversely of the housing is positioned on the rib 67 and a supporting wire 70 is looped over the pin. The ends of the wire are each connected to one of the pair of L-shaped levers 71 by hooking the ends in the apertures 72 and the levers 71 are pivotally connected at 73 to the contact base 74. Each of the levers 71 is provided with a catch 81 engaging the shoulder 68 for normally holding the base 74 upon the housing 66 and relieving the wire 70 of excessive strain.

The base 74 is provided with a pair of lugs 75 positioned in corresponding recesses 76 located in the lower end of the housing 66 and prevent rotation of the base relative to said housing. The ground wire 45 is secured in electrical contact with the base 74 by means similar to that previously described with reference to Fig. 1, and therefore it is not deemed necessary to repeat this description.

The device E is threadedly mounted on the anchor disk 78 which is secured to the electrode plate 19 by the bolt 79 threaded into the shank 19' on the electrode 19. A rubber washer 21 and gasket 22 are held in sealing relation to the bottom 2 of the lightning arrester 1 by means of the electrode 19 and bolt 79.

The wire 70 is spaced a predetermined distance from the head of the bolt and thus provides a gap across which an arc will be established when a surge is discharged through the arrester. When the arrester A fails to interrupt a current flow therethrough following a surge discharge, the arc formed between the bolt and the wire will cut the wire and release the levers 71. The weight of the base plate 74, connector parts and wire 45 will, after release of the levers 71, and under the influence of gravity, move these parts as a unit downwardly away from the housing 66 and thereby extend the gap between the arrester and ground sufficiently to interrupt a current flow through the arrester.

The modified form of circuit-interrupting device F shown in Figs. 9, 10 and 11 comprises a housing 82 made of any suitable insulating material such as "Bakelite" and provided with a fibre liner 83 which is threadedly secured in the lower portion of the housing. The liner is provided with a pair of longitudinally-extending apertures 84 loosely receiving a pair of plunger rods 85 therein, shown in Figs. 10 and 11, and resting on the base plate 87.

Intermediate the apertures 84 and extending parallel thereto is a pair of diametrically-disposed apertures 86 and disposed therein is a supporting wire 57 looped over the upper end of liner 83 and spaced from the terminal nut 94.

The base plate 87 is provided with lugs 88 which are positioned in the recesses 89 in the lower end of the housing 82 and hold the plate 87 against rotation relative to the housing. The plate is held in place by means of the wire 57 which passes through apertures 90 in the plate and is secured therein by punch marks 59.

The anchoring disk or terminal nut 94 is provided with a peripheral thread 95 engaging the housing 82, a flange portion 96 compressing the washer 21, a threaded aperture 97 engaging the shank 20 on the electrode 19, and a centrally-positioned arcing lug 93. The container 1, as in the other views, is sealed at the lower end by means of a rubber gasket 22 and the washer 21. The ground wire 45 is secured to the plate 87 in the manner heretofore described with reference to Fig. 5.

To insure that the circuit-interrupting device shown in Fig. 9 will perform its function after failure of the arrester, an explosive substance 91 may be placed in the chamber 92 between lug 93 and the strain wire 57.

When a surge sufficient to clinker the valve material 18 has passed therethrough, the heat of an arc established between the lug 93 and the nearest point on the wire 57, will ignite the explosive mixture 91 and at the same time cut the wire, whereupon the gases generated from the mixture will expand with sufficient force to impel the plunger rods 85 against the bottom 87 and thereby move the plate 87 with the attached wire 45 downwardly away from the housing 82 and introduce an extended gap between the arrester and ground. Operation of the device in the manner indicated produces an extended gap between the arrester and ground and assists in restoring the transmission line to normal conditions.

The circuit-interrupting device G shown in Fig. 12 comprises a frangible housing 100 closed at its upper end by a cap 101 having a stud 102 threadedly engaging the shank 19' on the plate electrode 19, and closed at its lower end by a cap 103. Both caps are sealed by any suitable sealing means as shown at 104.

The frangible housing is filled with silicon carbide 105 of any suitable mesh and a fusible conducting wire 106 is passed through the central position of the silicon carbide and electrically connects the two electrodes at 107 and 108. The ground wire 45 is secured to the bottom cap 103 in a manner similar to that described in reference to Fig. 1.

When an abnormal electrical surge occurs in the system, sufficient to cause the arrester to fail, the conducting wire 106 is melted and the resulting temperature rapidly heats the surrounding silicon carbide to a point which causes the frangible material, of which the housing is made, to break, thereby releasing the lower cap 103 and attached ground wire. As a result, an extended gap is produced which interrupts the circuit through the arrester.

If it is desired, the material 105 may comprise an explosive material which will be subjected to heat generated in the wire 106 and thereby caused to explode and rupture the housing 100.

In the structure shown in Fig. 13, the casing portion 110 of the auxiliary gap device H is an integral portion of the arrester casing 1 and is provided with an annular notch 111. As may be seen, the electrode plate 19 at the bottom of the valve material 18 is provided with a centrally-located shank portion 112 which extends into the casing portion 110 and has a reduced end 28 serving as an electrode portion. The electrode portion 28 is centrally apertured at 28' to receive a percussion cap 29 having a head 29'.

The lower end of the casing 110 is flanged inwardly at 38 and an electrode 24 is seated thereon with a sealing washer 42 interposed between the flange 38 and rim portion 33. The remaining portion of the device H is constructed as described with reference to Fig. 1 and need not be here again described.

As previously indicated, the casing 1 of the arrester is made of frangible material and since it is contemplated that the casing portion 110 is made of the same material, detonation of the cap 29 will, on release of the gases, preferably rupture the casing portion at the annular groove 111 and thereby permit the ground lead 45 to fall from the arrester and extend the gap.

Operation of the gap device H is the same as that described with reference to the Fig. 1 structure and, therefore, it is believed to be unnecessary to repeat that description.

From the foregoing disclosure, it will be apparent that I have provided a simple, automatic circuit-interrupting device which may be incorporated in a lightning arrester, which operates only when the arrester has failed in its function, which introduces an extended gap in the arrester circuit without destruction of the arrester assembly, which may be manufactured and assembled economically, and which will perform its function efficiently and effectively.

Although I have described and shown the auxiliary gap device connected between the arrester and the ground lead, it naturally follows that such device may be connected in the line terminal lead-in conductor. Therefore, it will be understood that the appended claims are not to be limited to the exact disclosure unless the phraseology thereof clearly indicates such limitations.

I claim:

1. The combination with a lightning arrester having a terminal portion, of an automatic circuit-interrupting device comprising an insulating housing, a pair of electrodes mounted on said housing, one of which electrodes is connected to said terminal portion, the other of said electrodes being disconnectible from said housing under predetermined conditions of current flow through said arrester, and means for disconnecting the last-mentioned electrode, said means being responsive to said current flow under said predetermined conditions for releasing the last-mentioned electrode.

2. The combination with a lightning arrester having a terminal portion, of an automatic circuit-interrupting device comprising an insulating housing, a pair of electrodes mounted on said housing in spaced and insulated relation to provide an air gap, one of said electrodes being connected to said terminal portion, the other of said electrodes being disconnectible from said housing, and means for disconnecting the last-mentioned electrode, said means being responsive to a predetermined maximum current flow across said gap for disconnecting the last mentioned electrode and being non-responsive to current flow less than said maximum current flow.

3. The combination with a lightning arrester having a terminal portion, of an automatic circuit-interrupting device comprising an insulating housing, a pair of electrodes mounted on said housing in spaced and insulated relation to provide an air gap, one of said electrodes being connected to said terminal portion, the other of said electrodes being disconnectible from said housing, and an explosive cap carried by one of said electrodes and adapted to explode in response to predetermined conditions of current flow across said gap, thereby to release said other of said electrodes and extend said gap.

4. The combination with a lightning arrester having a terminal portion, of an automatic circuit-interrupting device including insulating means, a pair of spaced insulated electrodes supported by said insulating means to provide an air gap, one of said electrodes being connected with said terminal portion and the other of said electrodes being disconnectible from said insulating means, and disconnecting means responsive to predetermined current flow across said gap for disconnecting the last-mentioned electrode.

5. The combination with a lightning arrester having a terminal portion, of an automatic circuit-interrupting device including insulating means, a pair of electrodes supported by said insulating means, one of said electrodes being connected with said terminal portion, and means responsive to a predetermined condition of current flow through said arrester for moving the other of said electrodes to produce an extended gap.

6. The combination with a lightning arrester having a terminal portion, of an automatic circuit-interrupting device connected with said terminal portion and comprising an extensible gap in series relation to said arrester and means for extending said gap in response to predetermined conditions of current flow through said arrester.

7. An automatic circuit-interrupting device for protective apparatus in an electric transmission line, said device comprising a frangible insulating housing, an electrode mounted on one end of said housing and having a reduced recessed end extending thereinto, an explosive cap in said recess, a second electrode mounted on the other end of said housing in spaced and insulated relation to the other electrode and said cap and extending into said housing, and connector means on said second electrode for connecting a lead wire thereto.

8. An automatic circuit-interrupting device for protective apparatus in an electric transmission line, said device comprising a frangible insulating housing, an electrode mounted on one end of said housing, a second electrode mounted on the other end of said housing, said electrodes being in insulated relation to provide a gap, an explosive medium in said housing exposed to the heat of an arc across said gap, and connector means on each of said electrodes for connecting the latter in a surge discharge circuit for said line, said explosive medium being designed to detonate in response to the heat of said arc and operative upon detonation to rupture said housing and thus cause a separation of said electrodes and extinction of said arc.

9. An automatic circuit-interrupting device for protective apparatus in an electric transmission line, said device comprising an insulating housing, a first electrode fixedly attached to one end of said housing, a second electrode releasably attached to the other end of said housing in spaced relation to the first electrode to provide a gap therebetween, a destructible wire secured to said housing and second electrode for releasably supporting said second electrode and disposed in said gap, and connector means on said electrodes, whereby under predetermined conditions of failure of said protective apparatus, an arc established across said gap will sever said wire and release said second electrode.

10. An automatic circuit-interrupting device for protective apparatus in an electric transmission line, said device comprising an insulating housing, a first electrode fixedly attached to one end of said housing, a second electrode releasably attached to the other end of said housing in spaced relation to the first electrode to provide a gap therebetween, a destructible wire secured to said housing and second electrode for releasably supporting said second electrode and disposed in said gap, means carried in said housing for moving said second electrode upon release thereof from said housing, and connector means on said electrodes, whereby under predetermined conditions of failure of said protective apparatus, an arc established across said gap will sever said wire and release said second electrode.

11. An automatic circuit-interrupting device for protective apparatus in an electric transmission line, said device comprising an insulating housing, a first electrode fixedly attached to one end of said housing, a second electrode releasably attached to the other end of said housing in spaced relation to the first electrode to provide a gap therebetween, a destructible wire secured to said housing and second electrode for releasably supporting said second electrode and disposed in said gap, spring means biasing said second electrode for movement away from said housing upon release therefrom, and connector means on said electrodes, whereby under predetermined conditions of failure of said protective apparatus, an arc established across said gap will sever said wire and release said second electrode.

12. An automatic circuit-interrupting device for protective apparatus in an electric transmission line, said device comprising an insulating housing, a first electrode fixedly attached to one end of said housing, a second electrode releasably attached to the other end of said housing, latching means pivotally secured to said second electrode and releasably engaging the housing to normally secure the second electrode thereto, and a destructible wire in said housing disposed between said electrodes and spaced from the first electrode, said wire being normally secured to said housing and holding said latching means in operative latching relation to said housing.

13. An automatic circuit-interrupting device for protective apparatus in an electric transmission line, said device comprising a frangible insulating housing, a first conductive plug closing one end of said housing, a second conductive plug closing the other end of said housing, said second plug having a tubular shank projecting from said housing, a washer on said shank interlocking said second plug and housing to prevent relative rotation thereof, a lock nut threaded on said shank, a clamping bolt threaded into said shank, a clamping plate on said bolt having means for holding a wire thereon and for engaging said nut, and a plate-actuating disk on said bolt having a spheroidal surface engaging said plate, the point of application of stresses tending to distort the bolt in a lateral direction being disposed between the point of engagement of said wire and the axis of said bolt.

14. In a lightning arrester having a gap and a current-limiting means in series connection with said arrester and normally in non-conducting relation to an electric line, a current-responsive means for severing a line connection to said arrester, said responsive means having time-current characteristics rendering such operative under sustained arcing conditions in said arrester.

15. A first current responsive device normally in non-conducting relation to an electric line but subject to surge currents therein, in combination with a destructible current-responsive device normally in non-conducting relation to said electric line and having stored energy means for introducing an extended gap therein, said device having time-current characteristics whereby upon the occurrence of a sustained flow of current through said first mentioned device, said energy will be released and said gap introduced.

16. A destructible current-responsive gap device including a frangible housing and stored energy means for rupturing said housing, said device being normally in non-conducting relation to an electric line and responsive to current flow through said device and having time-current characteristics whereby upon the occurrence of a sustained flow of current through said device, said energy will be released and said housing ruptured.

17. A circuit-interrupting device comprising a pair of spaced electrodes, insulating means connecting said electrodes to provide a gap, and current responsive means subject to current flow across said gap for dislodging one of said electrodes and displacing the same relatively to the other of said electrodes.

18. In combination with a lightning arrester having a terminal electrode, a second electrode, insulating means connecting said electrodes, and current responsive means subject to current flow through said arrester for dislodging said second electrode and displacing the same relatively to said terminal electrode.

19. An automatic circuit-interrupting device for protective apparatus in an electric transmission line, said device comprising an insulating housing, an electrode mounted on one end of said housing and having a recessed end, an explosive element carried in said recessed end, a second electrode mounted on the other end of said housing and having an annular rim in spaced relation to the first mentioned electrode and concentric to said explosive element, whereby an arc established in said device will strike between said rim and the first mentioned electrode adjacent said element.

20. An automatic circuit-interrupting device for protective apparatus in an electric transmission line, said device comprising an insulating housing, a fiber element in said housing and having wire passages, a first electrode secured to said housing and adjacent one end of said fiber element, a destructible wire disposed in said passages and anchored intermediate its ends to said element adjacent the first electrode, a second electrode adjacent the other end of said fiber element, the ends of said wire being secured to said second electrode and holding the second electrode adjacent said other end of said fiber element, whereby under predetermined conditions of failure of said protective apparatus, an arc established between said first electrode and said wire will sever said wire and release said second electrode.

21. The combination recited in claim 20 with spring means biasing said second electrode for movement away from said housing upon release therefrom, whereby under predetermined condition of failure of said protective apparatus, an arc established between said first electrode and said wire will sever said wire and release said second electrode.

22. An automatic circuit-interrupting device for protective apparatus in an electric transmission line, said device comprising an insulating housing, a support element having a plurality of openings therethrough, a movable plunger in at least one of said openings, a destructible wire disposed in the other of said openings and having its intermediate portion anchored to said element, a first electrode at one end of said housing in spaced relation to said wire, a second electrode secured at the other end of said housing by means of said wire, and an explosive medium in said housing exposed to the heat of an arc established between said first electrode and said wire, the explosion of said medium causing said plunger to move said second electrode away from said housing.

23. A device comprising a pair of spaced electrodes having an arc gap therebetween, an explosive element operative upon detonation to extinguish an arc in said gap, said explosive element being designed to detonate in response only to a predetermined minimum temperature applied thereto, and heat generating means including said arc gap for producing said predetermined temperature, said heating generating means being disposed in operative relation to said explosive element.

24. The combination in a circuit-interrupting device of a pair of co-operating electrodes, an explosive element operative upon detonation to separate said electrodes, and means defining an arc gap, said explosive element being designed to detonate only in response to an arc of predetermined duration across said gap.

25. The combination in a circuit-interrupting device of a pair of co-operating electrodes spaced apart to form an arc gap therebetween, an insulating frangible housing enclosing said arc gap and supporting at least one of said electrodes, an axial recess in one of said electrodes for the reception of an explosive cap, said recess being disposed in proximity to said arc gap, the arrangement being such that the temperature developed by an arc of predetermined duration across said gap will cause said explosive cap to detonate whereas a lesser temperature is ineffective so to do, said cap being operative, upon detonation, to rupture said housing and dislodge one of said electrodes so as to extinguish the arc across said gap.

26. A lightning arrester characterized by an air gap and arc-suppressing means for extinguishing an arc in said gap, in combination with current responsive means serially connected therewith for interrupting a flow of current therethrough, said current responsive means being responsive only to dynamic current flowing through said arrester, and said arc-suppressing means being adapted to ordinarily extinguish an arc before operation of said current-responsive means.

27. In a surge discharge circuit for connection between an electric line and ground, current limiting means in combination with a current responsive device in series connection with said means and normally in non-conducting relation to said electric line for interrupting a discharge current through said circuit, said current responsive device severing a connection to said means upon failure of said means to limit current flow through said discharge circuit, but said current limiting means being adapted to ordinarily so limit current flow through said discharge circuit that the current responsive device remains inactive.

28. Lightning protection apparatus adapted to be connected as a normally idle connection between a circuit conductor and ground, comprising an arrester forming a gap and including means tending to quench an arc across the gap maintained after the lightning by line voltage, and current-responsive means in series with the arrester in the normally idle connection adapted to form a break in said normally idle connection independent of the arrester and substantially longer than the arrester gap upon the passage through said normally idle connection of a current greater than a predetermined magnitude; said apparatus including means rendered noticeably different in appearance to a distant observer upon the occurrence of a break to indicate the presence of said break.

RALPH H. EARLE.